US010128682B2

(12) United States Patent
Jeong et al.

(10) Patent No.: US 10,128,682 B2
(45) Date of Patent: Nov. 13, 2018

(54) CHARGER FOR ELECTRIC VEHICLES

(71) Applicant: LSIS CO., LTD., Gyeonggi-do (KR)

(72) Inventors: Han-Uk Jeong, Gyeonggi-do (KR);
Yang-Young Kim, Gyeonggi-do (KR)

(73) Assignee: LSIS CO., LTD., Anyang-si,
Gyeonggi-Do (KR)

( * ) Notice: Subject to any disclaimer, the term of this patent is extended or adjusted under 35 U.S.C. 154(b) by 20 days.

(21) Appl. No.: 15/253,685

(22) Filed: Aug. 31, 2016

(65) Prior Publication Data

US 2017/0070083 A1    Mar. 9, 2017

(30) Foreign Application Priority Data

Sep. 4, 2015    (KR) ...................... 10-2015-01252511

(51) Int. Cl.
*H02J 7/00*    (2006.01)
*H02J 7/16*    (2006.01)
(Continued)

(52) U.S. Cl.
CPC .................. *H02J 7/16* (2013.01); *B60L 3/04* (2013.01); *B60L 11/1812* (2013.01);
(Continued)

(58) Field of Classification Search
CPC ...... H02J 7/0042; H02J 7/0045; H01M 10/46; H01M 10/44
(Continued)

(56) References Cited

U.S. PATENT DOCUMENTS 7,598,703 B2 * 10/2009 Zhang ................. B60L 11/1811
320/107
8,558,504 B2 * 10/2013 Brown .................. B60L 3/0069
320/109
(Continued)

FOREIGN PATENT DOCUMENTS

CN    103444067 A    12/2013
CN    104283258 A    1/2015
(Continued)

OTHER PUBLICATIONS

Japanese Office Action dated May 30, 2017 corresponding to application No. 2016-169311.
(Continued)

*Primary Examiner* — Arun C Williams
(74) *Attorney, Agent, or Firm* — K&L Gates LLP

(57) ABSTRACT

Disclosed embodiments relate to a charger body of a charger for electric vehicles. In some embodiments, a charger body may include an internal line resistor disposed between the wall outlet and the first connector, one end of internal line resistor being connected to the wall outlet and the other end of the internal line resistor being connected to the first connector; a switch, one end of the switch being connected to the first connector and the other end of the switch being connected to one end of the internal line resistor; relays, one end of each of the relays being connected to the first connector and the switch and the other end of each of the relays being connected to the second connector; and a controller controlling operation of the switch and the relays depending on a predetermined operation mode.

9 Claims, 8 Drawing Sheets

(51) Int. Cl.
*H02H 3/40* (2006.01)
*H02H 7/18* (2006.01)
*B60L 3/04* (2006.01)
*B60L 11/18* (2006.01)

(52) U.S. Cl.
CPC ............ *B60L 11/1816* (2013.01); *H02H 3/40* (2013.01); *H02H 7/18* (2013.01); *H02J 7/0021* (2013.01); *H02J 7/0045* (2013.01); *B60L 2230/12* (2013.01); *Y02T 10/7005* (2013.01); *Y02T 10/7088* (2013.01); *Y02T 90/121* (2013.01); *Y02T 90/127* (2013.01); *Y02T 90/14* (2013.01)

(58) Field of Classification Search
USPC .......................................................... 320/107
See application file for complete search history.

(56) References Cited

U.S. PATENT DOCUMENTS

| | | | | |
|---|---|---|---|---|
| 8,633,678 | B2* | 1/2014 | Yegin .................... | B60L 3/0069 320/134 |
| 8,760,116 | B2* | 6/2014 | Fujii ........................ | B60L 1/04 219/202 |
| 9,168,837 | B2 | 10/2015 | Ishii | |
| 9,308,825 | B2* | 4/2016 | Hayashigawa ..... | B60L 11/1862 |
| 2012/0206100 | A1 | 8/2012 | Brown et al. | |
| 2013/0015700 | A1 | 1/2013 | Ichikawa | |
| 2013/0076314 | A1* | 3/2013 | Nagakura ............. | H01M 10/44 320/162 |
| 2013/0201641 | A1* | 8/2013 | Soden ....................... | B60L 3/04 361/752 |
| 2014/0015482 | A1 | 1/2014 | Nitzberg et al. | |
| 2015/0185271 | A1 | 7/2015 | Kim et al. | |
| 2015/0303737 | A1 | 10/2015 | Steinbuchel, IV et al. | |

FOREIGN PATENT DOCUMENTS

| | | |
|---|---|---|
| EP | 2279896 A2 | 2/2011 |
| JP | 2012231556 A | 11/2012 |
| JP | 2013240191 A | 11/2013 |
| JP | 2015008600 A | 1/2015 |
| JP | 2015019571 A | 1/2015 |
| JP | 2015023717 A | 2/2015 |
| KR | 20000010029 A | 2/2000 |
| KR | 20040045747 A | 6/2004 |
| KR | 20140002253 A | 1/2014 |
| KR | 20150080122 A | 7/2015 |
| WO | 2011142004 A1 | 11/2011 |
| WO | 2014036013 A2 | 3/2014 |

OTHER PUBLICATIONS

European Search Report dated Jan. 5, 2017 in corresponding European Application No. 16184343.8.
Chinese Office Action for related Chinese Application No. 201610782910.9; action dated May 4, 2018; (6 pages).

* cited by examiner

-Prior Art-

CHARGER FOR ELECTRIC VEHICLES

CROSS REFERENCE TO RELATED APPLICATIONS

This application claims the benefit of Korean Patent Application No. 10-2015-0125251, filed on Sep. 4, 2015, entitled "CHARGER FOR ELECTRIC VEHICLES", which is hereby incorporated by reference in its entirety.

BACKGROUND

Technical Field

The present disclosure relates to a charger for electric vehicles, and more specifically to a charge for electric vehicles that senses a fault in a line or poor plug contact by measuring voltage and current from the line and controls output current based on the sensing.

Description of the Related Art

A charging circuit interrupting device (CCID) is a portable device that supplies electricity to electric vehicles and includes a relay, a main board, etc.

The CCID supplies electricity to electric vehicles connected thereto by opening/closing the relay.

FIG. 1 is a view showing an existing a charging circuit interrupt device (CCID).

Referring to FIG. 1, the CCID includes a plug 11 that is inserted into a socket (wall outlet), an electric wire 12 connecting the plug 11 with an electric vehicle, and a power switch 13 disposed at a predetermined position in the electric wire 12 and manually turned on/off to connect or interrupt the electric current flowing in the electric wire.

The CCID has the power switch 13 at a predetermined position of the electric wire to be turned on/off to control the flow of current. With the power switch, the current flowing in the power cord is not supplied to an electric vehicle even when the plug is inserted into the socket, making sure the user safety.

However, a user may make a mistake as she/he frequently connects and disconnects the plug into the wall outlet, resulting in an accident.

In particular, if the plug is detached from the wall outlet during charging of an electric vehicle, a great amount of current flows so that arc spark may be produced, resulting in damage.

Recently, a charger with a temperature sensor has been proposed, which interrupts output current from the charger depending on the temperature inside the charger measured by the temperature sensor.

However, the temperature inside the charger may not be accurately measured due to an error in the temperature sensor itself, such that an accident may occur.

In addition, since the output current is controlled when the temperature inside the charger exceeds a predetermined value, the temperature inside the charger is already increased, such that internal circuits may not be reliable.

SUMMARY

It is an aspect of some embodiments of the present disclosure to provide a charge for electric vehicles capable of removing a factor that causes increase in the temperature inside the charger before the temperature increases.

In addition, it is an aspect of some embodiments of the present disclosure to provide a charge for electric vehicles capable of controlling output current by detecting a fault in a line or poor connection between the plug and the socket.

In addition, it is an aspect of some embodiments of the present disclosure to provide a charge for electric vehicles capable of improving the operation reliability by allowing the charger to enter a mode for detecting a fault in a line or poor connection between the plug and the socket periodically.

Objects of some embodiments of the present disclosure are not limited to the above-mentioned objects. Other objects that are not mentioned may be apparent to those skilled in the art from the following description.

In accordance with one aspect of some embodiments of the present disclosure, a charger for electric vehicles includes: a first connector connected to a wall outlet supplying mains electricity; a second connector connected to a device to be charged; a charger body disposed between the first connector and the second connector and configured to control a path via which the mains electricity supplied from the first connector flows. The charger body includes: an internal line resistor disposed between the wall outlet and the first connector, one end of internal line resistor being connected to the wall outlet and the other end of the internal line resistor being connected to the first connector; a switch, one end of the switch being connected to the first connector and the other end of the switch being connected to one end of the internal line resistor; relays, one end of each of the relays being connected to the first connector and the switch and the other end of each of the relays being connected to the second connector; and a controller controlling operation of the switch and the relays depending on a predetermined operation mode. The operation mode may include a first operation mode in which the mains electricity is supplied to a first path including a device to be charged which is connected to the second connector to thereby supply charge power to the device to be charged, and a second operation mode in which the mains electricity is supplied to a second path including the internal line resistor to check a condition of an internal line of the charger.

The controller may determine the operation mode to be the second operation mode if a predetermined event happens. The event may include at least one of: a first event of detecting that the device to be charged is connected to the second connector, a second event that a predetermined period of time has elapsed, and a third event that a chargeable time according to a predetermined charge condition has elapsed.

The controller, in the second operation mode, may detect a line voltage and a line current flowing through the internal line resistor to detect overall line resistance based on the detected line voltage and line current, and determines the condition of the internal line depending on the detected overall line resistance.

The charger may further include: mains electricity line resistors disposed on an internal line of the mains electricity power source; and contact resistors disposed in the first connector and coming in contact with the socket. The overall line resistance may be determined by the mains electricity line resistors, the contact resistors and the internal line resistor.

The controller may allow the charge power to be supplied according to a charge condition required by the device to be charged if the overall line resistance is equal to or less than a first reference value, and may set a charge condition for charging the device to be charged if the overall line resistance is larger than the first reference value.

The controller may determine whether the overall line resistance is equal to or less than a second reference value if the overall line resistance is larger than the first reference value, may set a charge condition for supplying the charge power to the device to be charged according to the overall line resistance if the overall line resistance is equal to or less the second reference value, and may interrupt supplying the charge power to the device to be charged.

The controller may sets a chargeable time for which the charge power is allowed to be supplied to the device to be charged which is connected to the second connector and may allow the charge power to be supplied during the chargeable time if the overall line resistance is larger than the first reference value and equal to or less than the second reference value. The chargeable time may increase as the overall line resistance is closer to the first reference value while may decrease as the overall line resistance is closer to the second reference value.

The controller may check a charge current required by the device to be charged, and may adjust the set chargeable time according to the checked charge current. The chargeable time may decrease as the checked charge current increases.

The controller may turn on the relays and turn off the switch in the first operation mode, and may turn off the relays and turn on the switch in the second operation mode.

The condition of the internal line may be determined by a condition of a line inside the charger, a condition of the internal line of the mains electricity power source, and connection between the first connector and the socket.

According to an embodiment of the present disclosure, the line voltage and current across the line resistor in the charger are detected and the charging operation is controlled based on the detected line voltage and current, such that a fault in a line or whether the plug is correctly inserted into the wall outlet can be immediately determined before the actual temperature inside the charger is increased.

According to an embodiment of the present disclosure, as the device to be charged is connected, the charge current is supplied to a path that does not include the device but includes internal line resistor, such that the line voltage and current is detected according to the supplied charge current. By doing so, a fault in a line from the mains electricity as well as a fault in an internal line in the charger can be detected, thereby improving reliability of the product.

In addition, according to an embodiment of the present disclosure, if a fault occurs in a line or connection between a plug and socket is poor, output current is interrupted or reduced, such that it is possible to prevent a cause to increase temperature between the temperature inside the charge is increased. Accordingly, fire or an accident can be prevented.

Moreover, according to an embodiment of the present disclosure, a temperature sensor inside a charger may be eliminated, and thus there is no need to qualify complicated requirements of temperature sensors for different countries. As a result, cost and time can be saved.

DETAILED DESCRIPTION

Figure 1:
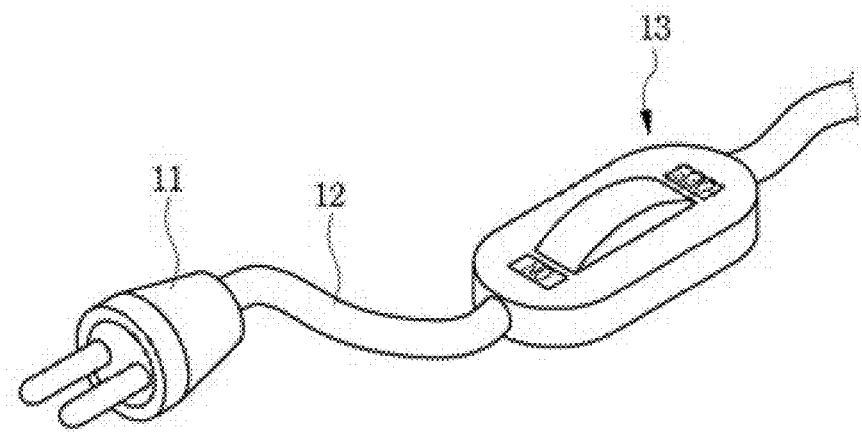
FIG. 1 is a view showing an existing a charging circuit interrupt device (CCID), according to the prior art.

Advantages and features of the present disclosure and methods to achieve them will become apparent from the descriptions of embodiments herein below with reference to the accompanying drawings. However, the present disclosure is not limited to embodiments disclosed herein but may be implemented in various different ways. The embodiments are provided for making the disclosure of the present disclosure thorough and for fully conveying the scope of the present disclosure to those skilled in the art. It is to be noted that the scope of the present disclosure is defined solely by the claims. Like reference numerals denote like elements throughout the descriptions.

Detailed descriptions of well-known functions and structures incorporated herein will be omitted to avoid obscuring the subject matter of the present disclosure. Further, terms or words used in the specification and claims shall not be construed merely in a conventional and dictionary definition but shall be construed in a meaning and concept corresponding to the technical idea of the present disclosure based on the principle that an inventor is allowed to properly define the concepts of terms in order to describe his or her disclosure in the best way. Therefore, the terms, such as those defined in commonly used dictionaries, should be interpreted as having a meaning that is consistent with their meaning in the context of the relevant art and/or the present application.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow charts. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products containing instruction means for performing the functions described in the blocks in the drawings or in the steps in the flow charts. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow chart.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

Figure 2:
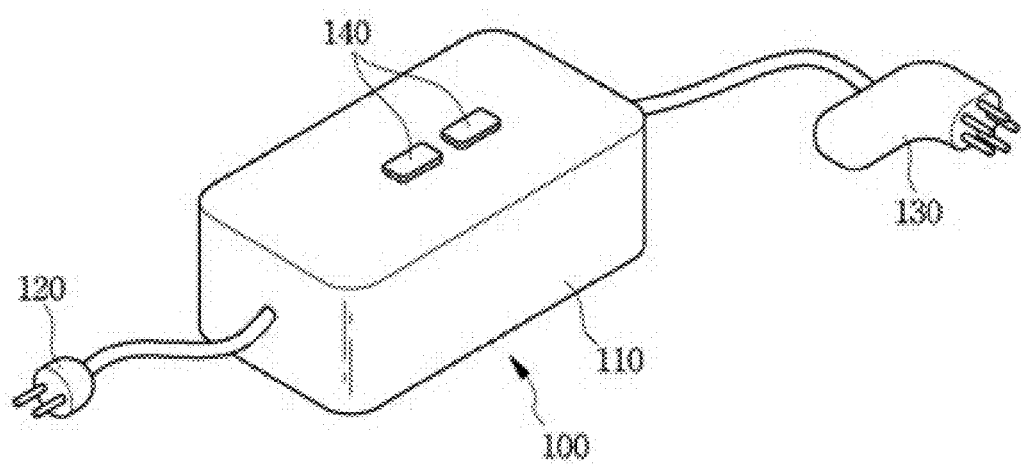
FIG. 2 is a view showing a charger for electric vehicles according to an embodiment of the present disclosure.
Figure 3:
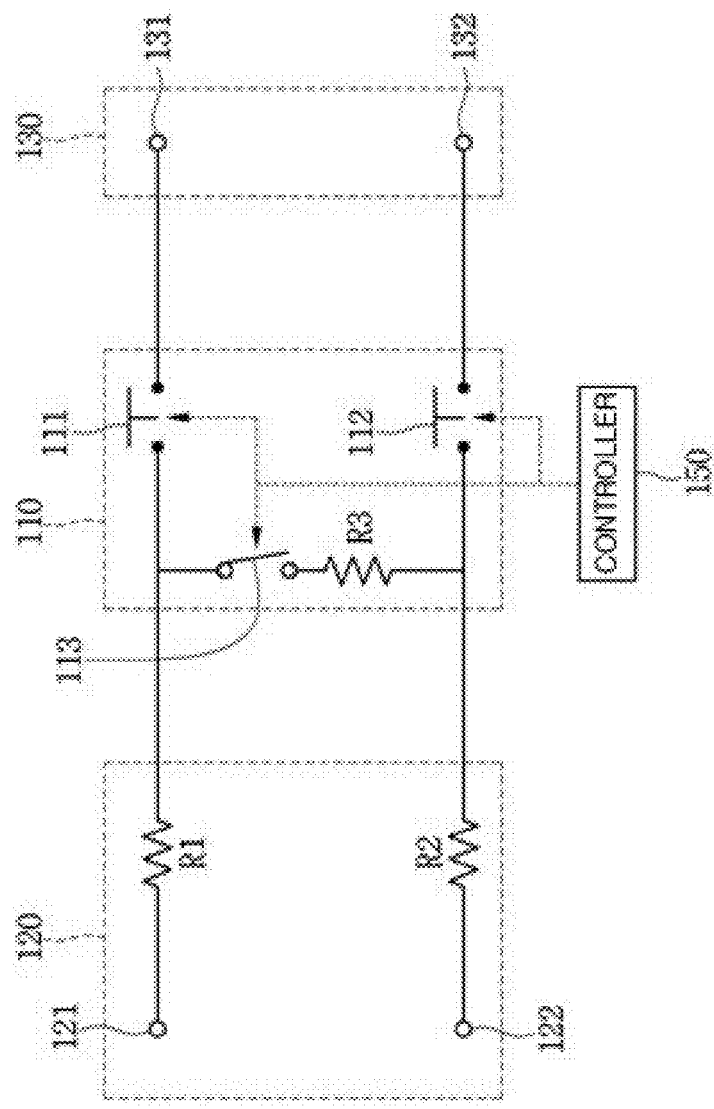
FIG. 3 is a circuit diagram of the electric vehicle charger shown in FIG. 2 according to an embodiment of the present disclosure.

FIG. 2 is a view showing a charger for electric vehicles according to an embodiment of the present disclosure. FIG. 3 is a circuit diagram of the charger for electric vehicles shown in FIG. 2.

Hereinafter, a charger for electric vehicles according to the embodiment of the present disclosure will be described referring to FIGS. 2 and 3.

Referring to FIGS. 2 and 3, the charger for electric vehicles comes with a cord set, one side of the charger being connected to a wall outlet and the other side of the charger being connected to a device to be charged. The charger receives power supplied from the wall outlet and supplies charge power to the device to be charged.

The charger includes a charger body 110, a first connector 120 and a second connector 130.

The first connector 120 is connected to one side of the charger body 110 while the second connector 130 is connected to the other side of the charger body 110.

The first connector 120 is inserted into a wall outlet that supplies mains electricity, receives the mains electricity via the inserted plug, and supplies the received mains electricity to the charger body 110.

The second connector 130 is inserted into a charge plug (not shown) of an electric vehicle to be charged. In addition, the second connector 130 receives the charge power from the mains electricity via the charger body 110, and supplies the received charge power to the electric vehicle, specifically, to a battery installed in the electric vehicle.

Each of the first connector 120 and the second connector 130 may include two lines. That is, each of the first connector 120 and the second connector 130 may include a positive power line supplying power of positive polarity and a negative power line supplying power of negative polarity.

In addition to the positive power line and the negative power line, each of the first connector 120 and the second connector 130 may further include a communications line for performing communications with a device to be charged which is connected to the second connector 130, and a ground line.

The charger body 110 includes circuits for operating and controlling the charger for electric vehicles therein.

A plurality of selection buttons 140 may be formed on outside the charger body 110 for setting operational features of the charger for electric vehicles.

One of the selection buttons 140 may be a condition check button for checking a condition of a line inside the charger for electric vehicles, and another may be a button for turning on or off the operation of the charger.

The charger for electric vehicles may be operated in a first operation mode in which charge power is supplied to a device to be charged which is connected to the second connector 130, and in a second operation mode in which the condition of the line inside the charger for electric vehicles is checked.

The charger for electric vehicles, in the first operation mode, supplies charge power to the battery of the device to be charged via the first connector 120 and the second connector 130.

Preferably, the first connector 120 is connected to a wall outlet, e.g., mains electricity, and the second connector 130 is connected to a device to be charged. If there is no fault in the internal line, the charger for electric vehicles receives mains electricity supplied via the first connector 120, and supplies the received mains electricity to the device to be charged which is connected to the second connector 130.

In addition, the charger for electric vehicles, in the second operation mode, checks the condition of the internal line in the charger body 110.

Preferably, the condition of the internal line may include a line current value and a line voltage value across a line resistor disposed on an internal line, and the overall line resistance.

To this end, e.g., in order to check the condition of the internal line, the charger body 110 allows the mains electricity input via the first connector 120 to flow to a path that does not include the device to be charged which is connected to the second connector 130, e.g., a path that includes a line resistor disposed in the charger body 110.

In other words, in the second operation mode, a power supply path is formed so that the mains electricity is supplied into the charger body 110, and thus no charge power is supplied to the device to be charged even if it is connected to the second connector 130.

The charger body 110 determines whether to supply the charge power to the device to be charged which is connected to the second connector 130 based on the condition of the internal line checked in the second operation mode.

In other words, if it is determined that the condition of the lines is a first condition (normal condition), the charger body 110 supplies the charge power required by the device to be charged via the second connector 130 to it.

In addition, if it is determined that the condition of the internal line is a second state (conditionally abnormal state), the charger body 110 sets a charge condition of the device to be charged which is connected to the second connector 130 and supplies the charge power to the device to be charged depending on the set charge condition.

The charge condition may include a chargeable time in which charge current is supplied from the charger for electric vehicles to the device to be charged, and the magnitude of the charge current.

In other words, if the condition of the internal line is conditionally abnormal state, the charger body 110 allows the charge power corresponding to a particular charge current to be supplied to the device to be charged only for a predetermined time. If the predetermined charge time has been elapsed, the charger body interrupts the charge power supplied to the device to be charged.

After the charge power is interrupted, the charger body 110 may enter the second operation mode again, check the condition of the internal line again, and reset the charge condition depending on the rechecked result.

If it is determined that the condition of the internal line is a third state (an abnormal state), the charger body 110 interrupts the charge power supplied to the device to be charged, and allows a notification signal for notifying the abnormal state to be output.

Hereinafter, the above-described charger for electric vehicles will be described in more detail.

Referring to FIG. 3, the charger for electric vehicles includes the charger body 110, the first connector 120 and the second connector 130, and further includes a controller 150 controlling the operation of the charger for electric vehicles.

The first connector 120 includes a first terminal 121 receiving positive power and a second terminal 122 receiving negative power.

In addition, the first connector 120 includes a first contact resistor R1 including an end connected to the first terminal 121 and a second contact resistor R2 including an end connected to the second terminal 122.

The second connector 130 includes a third terminal 131 supplying positive power supplied via the first terminal 121 to the device to be charged, and a fourth terminal 132 supplying negative power supplied via the second terminal 122 to the device to be charged.

In the charger body 110, there is disposed a selection circuit that forms a path in which the mains electricity supplied via the first terminal 121 and the second terminal 122 is output so that the charger operates the first operation mode or the second operation mode.

In the related art, the charger body 110 includes a first relay 111 disposed between the first terminal 121 and the third terminal 131 to supply/interrupt the charge power supplied to the device to be charged, and a second relay 112 disposed between the second terminal 122 and the fourth terminal 132 to supply/interrupt the charge power supplied to the device to be charged.

In contrast, according to an embodiment of the present disclosure, the charger body 110 further includes a switch 113 and a line resistor R3 for implementing the second operation mode, as well as the first relay 111 and the second relay 112.

One end of the switch 113 is connected to one end of the first relay 111, and the other end of the switch 113 is connected to one end of the second relay 112.

The line resistor R3 is disposed between the other end of the switch 113 and the end of the second relay 112.

Accordingly, one end of the line resistor R3 is connected to the other end of the switch 113 and the other end of the line resistor R3 is connected to the end of the second relay 112.

In addition, the other end of the first relay 111 is connected to the third terminal 131, and the other end of the second relay 112 is connected to the fourth terminal 132.

The controller 150 controls on-/off-states of the first relay 111, the second relay 112 and the switch 113.

That is, the controller 150 allows the first relay 111, the second relay 112 and the switch 113 to operate in the on-state or off-state depending on a predetermined operation mode between the first operation mode and the second operation mode.

Preferably, if the operation mode of the charger for electric vehicles is determined to be the first operation mode, the controller 150 turns on the first relay 111 and the second relay 112 while turns off the switch 113.

Accordingly, the controller 150 allows the switch 113 to be in the off-state while the first relay 111 and the second relay 112 to be in the on-state. As a result, the mains electricity supplied via the first connector 120 flows to the path that does not include the line resistor R3 but includes the device to be charged which is connected to the second connector 130.

In addition, if the operation mode of the charger for electric vehicles is determined to be the second operation mode, the controller 150 turns off the first relay 111 and the second relay 112 while turns on the switch 113.

Accordingly, the controller 150 allows the switch 113 to be in the on-state while allows the first relay 111 and the second relay 112 to be in the off-state, such that the mains electricity supplied via the first connector 120 flows to the path that does not include the device to be charged but includes the line resistor R3.

In other words, in the first operation mode, the mains electricity supplied via the first connector 120 flows to the path including the device to be charged via the second connector 130, and, in the second operation mode, the mains electricity supplied via the first connector 120 flows to the path including the line resistor R3.

Figure 4:
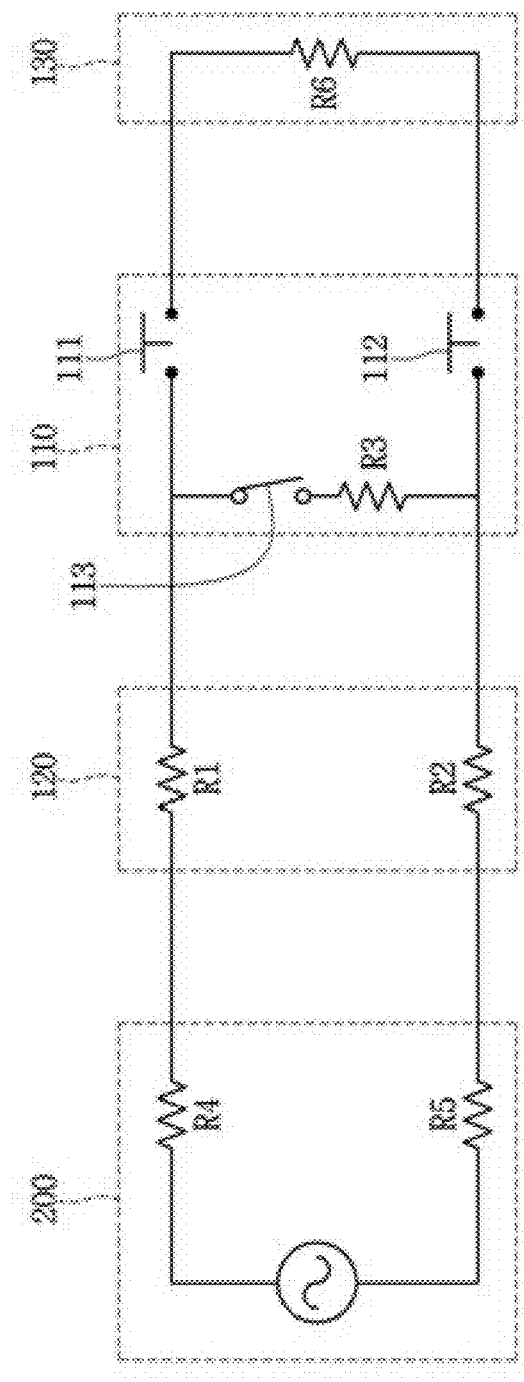
FIG. 4 is a circuit diagram of a system for charging electric vehicles according to an embodiment of the present disclosure.
Figure 5:
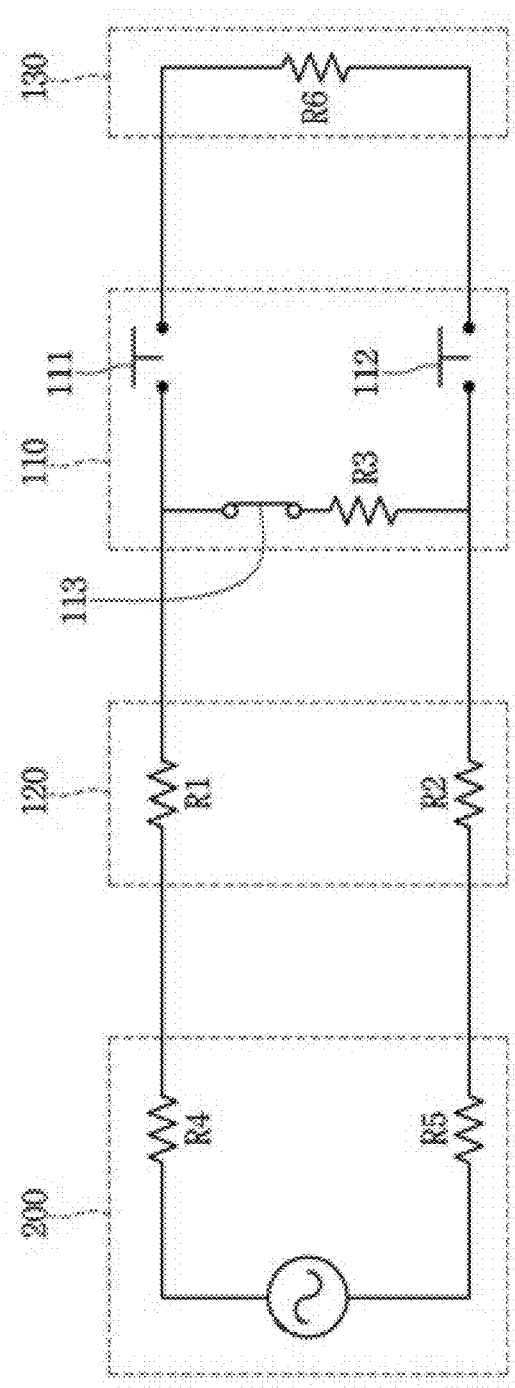
FIG. 5 is a circuit diagram of the charger in the second operation mode according to an embodiment of the present disclosure.
Figure 6:
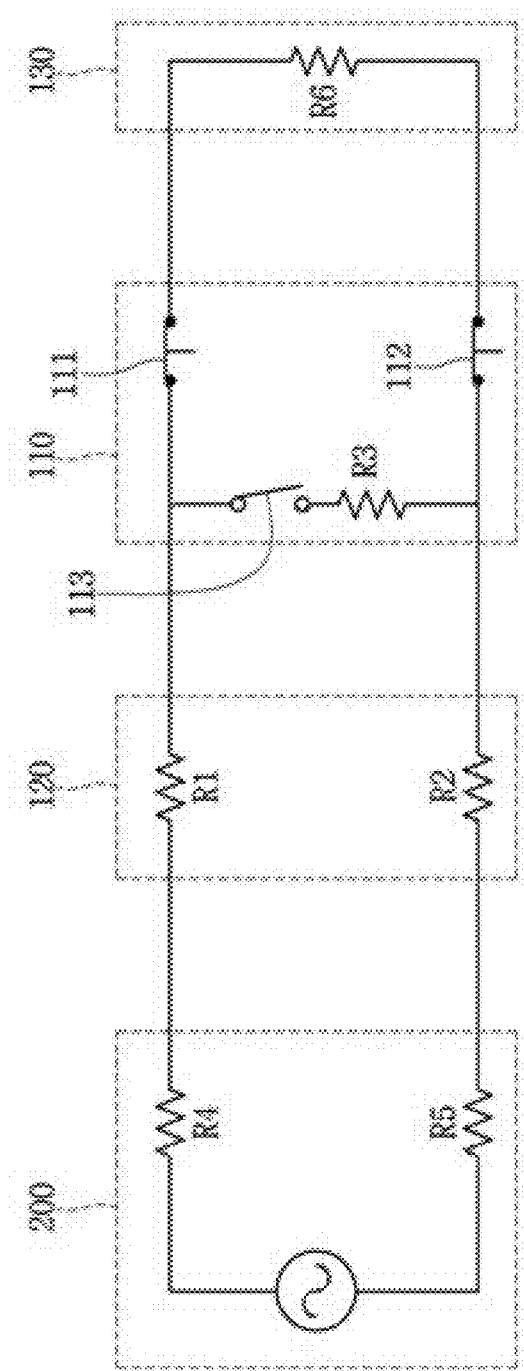
FIG. 6 is a circuit diagram of the charger in the first operation mode according to an embodiment of the present disclosure.

FIG. 4 is a circuit diagram of a system for charging electric vehicles. FIG. 5 is a circuit diagram of the charger in the second operation mode according to an embodiment of the present disclosure. FIG. 6 is a circuit diagram of the charger in the first operation mode according to an embodiment of the present disclosure.

Referring to FIG. 4, the first connector 120 is connected to a wall outlet, and mains electricity power source AC is connected to one end of the first connector 120 if the second connector 130 is connected to a device to be charged. Line resistors R4 and R5 are connected between the mains electricity power source AC and the first connector 120.

That is, the first connector 120 is connected to the mains electricity supply unit 200 that forms the mains electricity power source AC.

External line resistors R4 and R5 are connected between the first connector 120 and the mains electricity supply unit 200. The external line resistors R4 and R5 includes a first external line resistor R4 disposed in a power line of positive polarity and a second external line resistor R5 disposed in a power line of negative polarity. They provide safety between the mains electricity supply unit 200 and the first connector 120.

Specifically, when the first connector 120 is inserted into the socket of mains electricity, the first terminal 121 of the first connector 120 is connected to the first external line resistor R4 corresponding to an internal line resistor in the mains electricity power source AC. In addition, the second terminal 122 of the first connector 120 is connected to the second external line resistor R5 corresponding to an internal line resistor in the mains electricity power source AC.

When the second connector 130 is connected to a device to be charged, the third terminal 131 of the second connector 130 is connected to one end of a load R6 corresponding to the device to be charged, and the fourth terminal 132 of the second connector 130 is connected to the other end of the load R6.

In addition, referring to FIG. 5, if the operation mode of the charger for electric vehicles is determined to be the second operation mode, the controller 150 turns on the switch 113 while turns off the first relay 111 and the second relay 112.

Accordingly, the controller 150 allows the mains electricity supplied via the first connector 120 to flow to the path that does not include the load R6 but includes the internal line resistor R3.

Accordingly, in the second operation mode, the mains electricity flows in the path including the first external line resistor R4, the first contact resistor R1, the switch 113, the internal line resistor R3, the second contact resistor R2 and the second external line resistor R5.

In addition, referring to FIG. 6, if the operation mode of the charger for electric vehicles is determined to be the first operation mode, the controller 150 turns off the switch 113 while turns on the first relay 111 and the second relay 112.

Accordingly, the controller 150 allows the mains electricity supplied via the first connector 120 to flow to the path that does not include the internal line resistor R3 but includes the load R6.

Accordingly, in the first operation mode, the mains electricity flows in the path including the first external line resistor R4, the first contact resistor R1, the first relay 111, the load R6, the second relay 112, the second contact resistor R2 and the second external line resistor R5.

The controller 150 determines the operation mode of the charger for electric vehicles based on predetermined conditions.

The charger for electric vehicles operates in the first operation mode normally, and operates in the second operation mode at the time of occurrence of a predetermined event.

The time of occurrence of the event may be one of the time of detecting that a device is connected to the second connector 130, the time when a predetermined time period has elapsed, and the time when a chargeable time has been elapsed depending on a predetermined charging condition.

Upon detecting that a device is connected to the second connector 130, the controller 150 checks the condition of the internal line before supplying charge power to the device, and supplies the charge power based on the result of the checking.

In addition, the controller 150 controls the charger such that it operates in the second operation mode at every predetermined period.

In addition, if it is determined that the condition of the internal line is the second state and accordingly chargeable time is set, the controller 150 controls the charger so that it operates in the second operation mode at the time when the set chargeable time has been elapsed.

In this manner, the line voltage and current across the line resistor in the charger are detected and the charging operation is controlled based on the detected line voltage and current, such that a fault in a line or whether the plug is correctly inserted into the wall outlet can be immediately determined before the actual temperature inside the charger is increased.

In addition, as the device to be charged is connected, the charge current is supplied to a path that does not include the device but includes internal line resistor, such that the line voltage and current are detected according to the supplied charge current. By doing so, a fault in a line from the mains electricity as well as a fault in an internal line in the charger can be detected, thereby improving the reliability.

Figure 7:
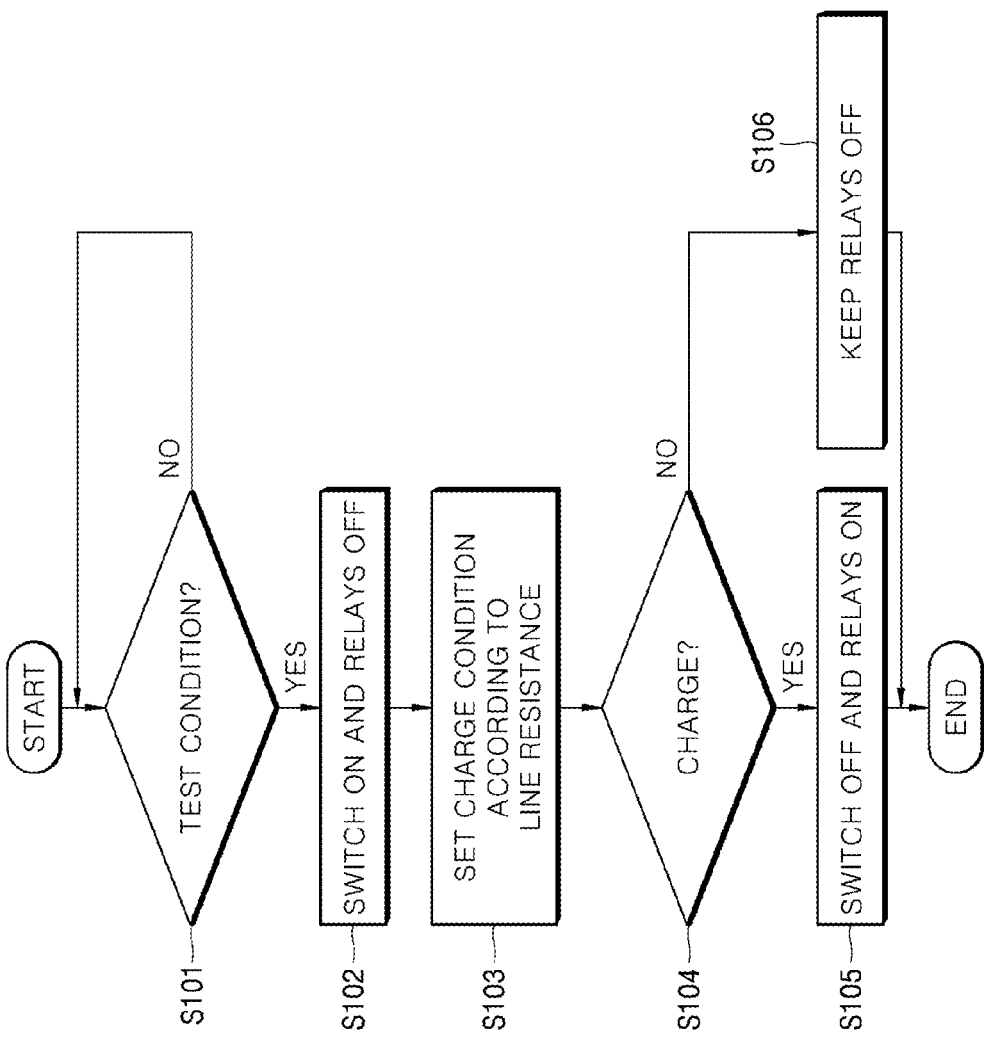
FIGS. 7 to 9 are flowcharts for illustrating steps of a method for operating a charger for electric vehicles according to an embodiment of the present disclosure.
Figure 8:
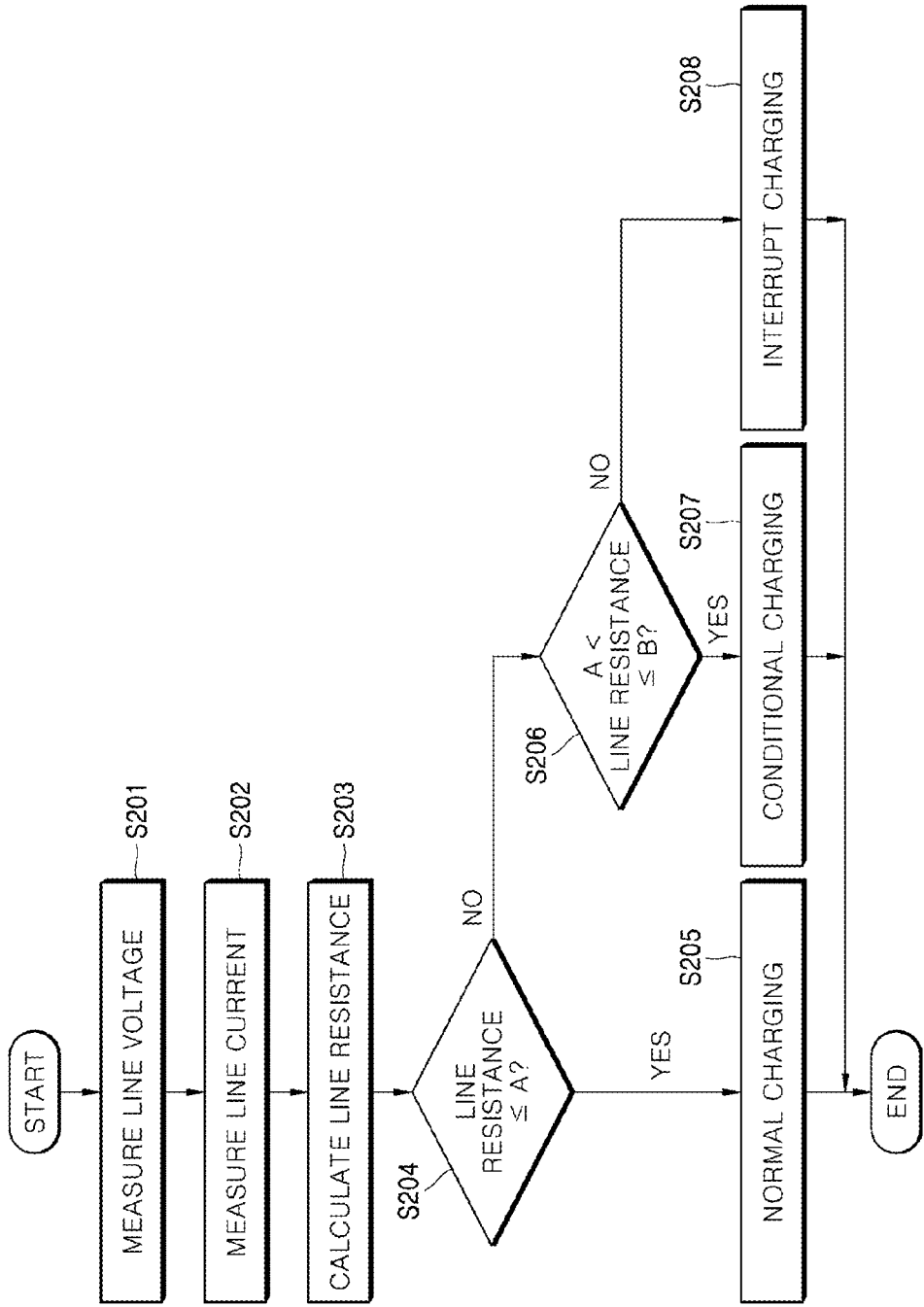
Figure 9:
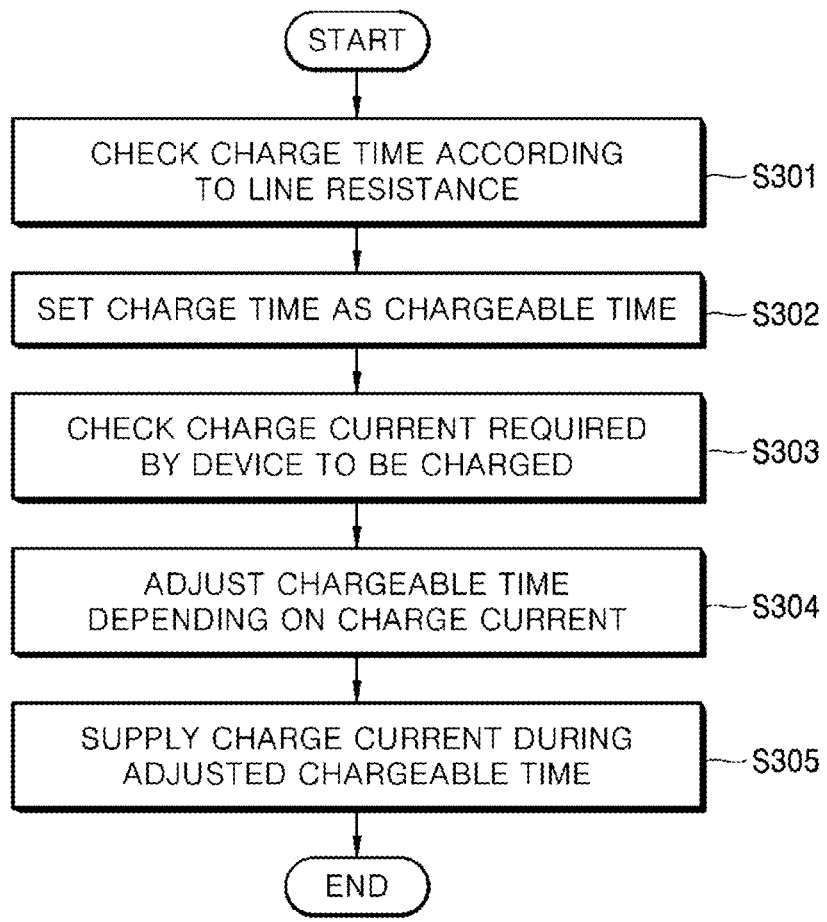

FIGS. 7 to 9 are flowcharts for illustrating steps of a method for operating a charger for electric vehicles according to an embodiment of the present disclosure.

Hereinafter, the method for operating a charger for electric vehicles will be described in more detail with reference to FIGS. 7 to 9.

Referring to FIG. 7, the controller 150 determines whether there occurs a condition for testing the charger for electric vehicles (step S101). The testing refers to a test for the condition of internal line in the charger for electric vehicles.

Specifically, the controller 150 determines whether there has occurred at least one event for the charger to operate in the second operation mode.

For example, the controller 150 determines whether a device is connected to the second connector 130, whether a predetermined period has elapsed that is previously set when the charger was operating in the second operation mode, or whether a chargeable time has elapsed according to the condition of the internal line previously determined.

If it is determined that there has occurred a test condition for the charger, the controller 150 turns on the switch 113 and accordingly turns off the first relay 111 and the second relay 112 (step S102).

As the switch 113 is turned on, mains electricity supplied via the first connector 120 flows to the path including the internal line resistor R3, not to the device to be charged which is connected to the second connector 130.

Then, the controller 150 detects current, voltage of the internal line according to the power flowing in the power path determined by turning on the switch 113 and resistance of the overall lines, and determines the condition of the internal line by using the detected resistance (step S103).

The controller 150 determines whether the first connector 120 is inserted into the wall outlet incorrectly, or whether there is a fault in the internal line in the mains electricity power source AC.

In the related art, the condition of the internal line refers to only the condition of the internal line in the charger. According to embodiments of the present disclosure, however, it is to be noted that condition of the internal line not only refers to the condition of the internal line in the charger but also refers to the condition of the internal line in the mains electricity power source AC, e.g., the condition of an external line of the charger.

In addition, the controller 150 sets the charge condition of the device to be charged which is connected to the second connector 130 depending on the determination result on the condition of the internal line.

The charging condition may include normal charging, interrupting charging and conditional charging.

Then, the controller 150 determines whether the set charge condition is normal charging or conditional charging (step S104).

In other words, the controller 150 determines whether the condition of the internal line is appropriate for supplying the charge power to the device to be charged which is connected to the second connector 130.

If so, the controller 150 turns off the switch 113 and turns on the first relay 111 and the second relay 123 (step S105).

That is, the controller 150 turns off the switch 113 and accordingly turns on the first relay 111 and the second relay 112, such that the charger for electric vehicles operates in the first operation mode and accordingly the charge power is supplied to the device to be charged which is connected to the second connector 130.

If not, the controller 150 keeps the first relay 111 and the second relay 112 in the off-state (step S106).

The controller 150 may keep the switch 113 in the on-state or turn it off, and may check again the condition of the internal line if the switch 113 is turned on.

In addition, if the switch 113 is turned off, the controller 150 may turn on the switch 113 at every period, and may check again the condition of the internal line depending on turned-on switch 113.

Hereinafter, the processes of setting charging conditions of the device to be charged will be described in more detail with reference to FIG. 8.

Initially, the controller 150 measures the line voltage flowing in the internal line resistor R3 as the charger for electric vehicles operates in the second operation mode (step S201).

That is, a voltage sensor may be disposed at an end of the internal line resistor R3, and accordingly the controller 150 may receive a voltage value sensed by the voltage sensor.

In addition, the controller 150 measures a line current flowing through the internal line resistor R3 (step S202).

That is, a current sensor may be disposed at an end of the internal line resistor R3, and accordingly the controller 150 may receive a current value sensed by the current sensor.

Then, the controller 150 uses the measured line voltage value and line current value to calculate the resistance value of the overall line of the path including the line resistor R3 (step S203)

The resistance value of the overall line is determined by the condition of the internal line of the charger for electric vehicles and the condition of the line of the mains electricity power source AC.

The resistance value of the overall line includes a reference value when the condition of the internal line is normal, and increases as a fault occurs in the condition of the internal line.

Preferably, the resistance value of the overall line includes a first value when the condition of the internal line of the charger for electric vehicles is normal, the first connector 120 is correctly inserted into a wall outlet, and the condition of the internal line of the mains electricity power source AC is normal.

In addition, the resistance value of the overall line increases as a fault occurs in at least one of the condition of the internal line of the charger for electric vehicles, the connection between the first connector 120 and the wall outlet, and the condition of the internal line of the mains electricity power source AC.

The resistance value of the overall line increases more as a fault occurring in at least one of the condition of the internal line of the charger for electric vehicles, the connection between the first connector 120 and the wall outlet, and the condition of the internal line of the mains electricity power source AC becomes more serious.

Accordingly, according to an embodiment of the present disclosure, the resistance value of the overall line includes a first reference value indicating normal state, and a second reference value indicating an abnormal condition but allows the charger to operate for a limited period of time.

The first and second reference values may be determined by the value of the internal line resistor R3 of the charger, the first contact resistor R1 and the second contact resistor R2.

The controller 150 determines whether the determined resistance value of the overall line is below the predetermined first reference value A (step S204).

That is, the controller 150 determines whether the condition of the internal line is a first state (normal state) depending on the determined resistance value of the overall line.

In other words, the controller 150 determines whether all of the condition of the internal line of the charger for electric vehicles, the connection between the first connector 120 and the wall outlet, and the condition of the internal line of the mains electricity power source AC.

If it is determined that the resistance value of the over line is below the predetermined first reference value, the controller 150 determines that the condition of the internal line is the first state (normal state) and accordingly the charge power is normally supplied to the device to be charged which is connected to the second connector 130 (step S205).

The controller 150 supplies the charge power depending on the charge current and charge time required by the device to be charged.

In addition, if it is determined that the resistance value of the overall line is larger than the first reference value the controller 150 determines whether the resistance value of the overall line is below the second first reference value B (step S206).

That is, the controller 150 determines whether the condition of the internal line is a second state (conditionally normal state) depending on the determined resistance value of the overall line.

In other words, the controller 150 determines whether the condition of the internal line is appropriate for supplying the charge power to the device to be charged which is connected to the second connector 130 for a predetermined period of time although there is a fault in the internal line.

In addition, the controller 150 sets the charging condition of the device to be charged if the determined resistance value of the overall line is below the second reference value, and allows the device to be charged according to the set charging condition (step S207).

That is, if it is determined that the resistance value of the overall line is larger than the first reference value and equal to or less than the second reference value, the controller 150 allows the charge power to be supplied to the device to be charged only for the charge time with the predetermined charge current.

In addition, it the resistance value of the overall line is larger than the second reference value, the controller 150 keeps the first relay 111 and the second relay 112 in the off-state and interrupts the charge power supplied to the device to be charged (step S208).

Hereinafter, a method for setting the charge conditions will be described in more detail with reference to FIG. 9.

Referring to FIG. 9, the controller 150 checks the chargeable time according to the calculated line resistance value (step S301).

That is, the controller 150 stores information on operable time of the charger for electric vehicles according to the line resistance value. The stored information comprises chargeable time information when the resistance value of the overall line ranges between the first reference value and the second reference value.

In addition, the chargeable time information increases as the resistance value of the overall line is closer to the first reference value and decreases as the resistance value of the overall line is closer to the second reference value.

Then, the controller 150 sets the chargeable time of the device to be charged which is connected to the second connector 130 by using the stored information.

Then, the controller 150 checks the charge current required by the specification of the device to be charged, more specifically the specification of a battery installed in the device (step S303).

Subsequently, once the charge current is checked, the controller 150 adjusts the set chargeable time according to the checked charge current (step 304).

That is, the chargeable time information may be specific to a particular charge current. Therefore, when the charge current is changed, the chargeable time also has to be changed accordingly.

Accordingly, once the charge current of the device to be charged is checked, the controller 150 adjusts the chargeable time according to the checked charge current.

For example, the charge current of the device to be charged is less than a predetermined reference value, the controller 150 may keep the set chargeable time or may increase it by a certain period of time.

If the charge current of the device to be charged is larger than a predetermined reference value, the controller 150 may decrease the set chargeable time by a certain period of time.

In addition, once the chargeable time is adjusted, the controller 150 supplies the charge power according to the charge current to be supplied to the device to be charged only during the adjusted chargeable time (step 305).

In addition, if the adjusted chargeable time has elapsed from the time point of supplying the charge power to the device to be charged, the controller 150 interrupts the charge power supplied to the device to be charged.

Once the charge power is interrupted as the chargeable time has elapsed, the controller 150 sets the operation mode of the charger to be the second operation mode and may check again the condition of the internal line.

According to an embodiment of the present disclosure, the line voltage and current across the line resistor in the charger are detected and the charging operation is controlled based on the detected line voltage and current, such that a fault in a line or whether the plug is correctly inserted into the wall outlet can be immediately determined before the actual temperature inside the charger is increased.

According to an embodiment of the present disclosure, as the device to be charged is connected, the charge current is supplied to a path that does not include the device but includes internal line resistor, such that the line voltage and current is detected according to the supplied charge current. By doing so, a fault in a line from the mains electricity as well as a fault in a internal line in the charger can be detected, thereby improving reliability of the product.

In addition, according to an embodiment of the present disclosure, if a fault occurs in a line or connection between a plug and socket is poor, output current is interrupted or reduced, such that it is possible to remove a factor that causes increase in the temperature before the temperature inside the charge is increased. Accordingly, fire or an accident can be prevented.

Moreover, according to an embodiment of the present disclosure, a temperature sensor inside a charger may be eliminated, and thus there is no need to qualify complicated requirements of temperature sensors for different countries. As a result, cost and time can be saved.

References to "one embodiment" or "an embodiment" do not necessarily refer to the same embodiment, although they may. Further, a particular feature, structure, effect in an embodiment may be practiced in other embodiments by combining or modifying them by those skilled in the art. Accordingly, it is to be understood that such combinations and modifications also fall within the scope of the present disclosure.

Although the embodiments of the present disclosure have been disclosed for illustrative purposes, those skilled in the art would appreciate that various modifications and substitutions may be made without departing from the scope and spirit of the disclosure. For example, elements of the embodiment of the present disclosure may be modified. Such modifications and substitutions are also construed as falling within the scope of the present disclosure as defined by the appended claims. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims

What is claimed is:

1. A charger for electric vehicles, the charger comprising:
a first connector configured to be connected to a socket of a mains electricity power source;
a second connector configured to be connected to a device to be charged;
a charger body configured to be disposed between the first connector and the second connector and configured to control the flow of the mains electricity supplied from the first connector,
wherein the charger body comprises:
an internal line resistor configured to be disposed between a wall outlet and the first connector, one end of the internal line resistor configured to be connected to the wall outlet and the other end of the internal line resistor configured to be connected to the first connector;
a switch, one end of the switch configured to be connected to the first connector and the other end of the switch configured to be connected to one end of the internal line resistor;
relays, one end of each of the relays configured to be connected to the first connector and the switch and the other end of each of the relays configured to be connected to the second connector;
a controller configured to control the switch and the relays based at least on a predetermined operation mode;
mains electricity line resistors disposed on an internal line of the mains electricity power source; and
contact resistors disposed in the first connector and in contact with the socket,
wherein an overall line resistance is determined by the mains electricity lines resistors, the contact resistors and the internal line resistor.

2. The charger of claim 1, wherein the operation mode comprises:
a first operation mode wherein the mains electricity is supplied to a first path including the device to be charged, the device connected to the second connector to supply charge power to the device to be charged, and
a second operation mode wherein the mains electricity is supplied to a second path including the internal line resistor in order to check a condition of an internal line of the charger.

3. The charger of claim 2, wherein the controller is further configured to determine the operation mode to be the second operation mode based at least on a predetermined event,
wherein the predetermined event comprises at least one of:
the device to be charged is connected to the second connector,
a predetermined period of time includes elapsed, or
a chargeable time based at least on whether the a predetermined charge condition has elapsed.

4. The charger of claim 3, wherein the controller, in the second operation mode, is further configured to detect a line voltage and a line current flowing through the internal line resistor to detect the overall line resistance based on the detected line voltage and line current, and determine the condition of the internal line depending on the overall line resistance.

5. The charger of claim 4, wherein the controller is further configured to allow the charge power to be supplied based at least on a charge condition required by the device to be charged if the overall line resistance is equal to or less than a first reference value, and set a charge condition for charging the device to be charged if the overall line resistance is larger than the first reference value.

6. The charger of claim 4, wherein the controller is further configured to determine whether the overall line resistance is equal to or less than a second reference value if the overall line resistance is larger than the first reference value, set a charge condition for supplying the charge power to the device to be charged based at least on the overall line resistance if the overall line resistance is equal to or less the second reference value, and interrupt supplying the charge power to the device to be charged.

7. The charger of claim 6, wherein the controller is further configured to set a chargeable time wherein the charge power is supplied to the device to be charged, the device connected to the second connector and allow the charge power to be supplied during the chargeable time if the overall line resistance is larger than the first reference value and equal to or less than the second reference value, wherein the chargeable time increases as the overall line resistance is closer to the first reference value and decreases as the overall line resistance is closer to the second reference value, wherein the controller is further configured to check a charge current required by the device to be charged, and adjust the set chargeable time based at least on the checked charge current, and wherein the chargeable time decreases as the checked charge current increases.

8. The charger of claim 2, wherein the controller is further configured to turn on the relays and turn off the switch in the first operation mode, and turn off the relays and turn on the switch in the second operation mode.

9. The charger of claim 1, wherein the condition of the internal line is determined by a condition of a line inside the charger, a condition of the internal line of the mains electricity power source, and connection between the first connector and the socket.

* * * * *